United States Patent [19]
Andersen

[11] Patent Number: 5,347,494
[45] Date of Patent: Sep. 13, 1994

[54] SHAPED-SWEEP TECHNOLOGY

[75] Inventor: Kenneth D. Andersen, Kingwood, Tex.

[73] Assignee: Exxon Production Research Company, Houston, Tex.

[21] Appl. No.: 86,776

[22] Filed: Jul. 1, 1993

[51] Int. Cl.⁵ ............................................. G01V 1/00
[52] U.S. Cl. ..................................... 367/42; 367/189; 367/905; 364/421
[58] Field of Search .................... 367/189, 190, 47, 48, 367/905, 42, 37; 181/113, 114; 364/421

[56] References Cited

U.S. PATENT DOCUMENTS

| | | | |
|---|---|---|---|
| 4,037,190 | 7/1977 | Martin | 340/15.5 |
| 4,204,278 | 5/1980 | Nelson | 367/39 |
| 4,598,392 | 7/1986 | Pann | 367/32 |
| 4,680,741 | 7/1987 | Mitchell et al. | 367/189 |
| 4,768,174 | 8/1988 | Castle | 367/39 |

OTHER PUBLICATIONS

"Vibroseis Signals with Prescribed Power Spectrums"; E. Rietsch; Abstract, *Geophysical Prospecting* vol. 25, pp. 613–620.

*Primary Examiner*—Ian J. Lobo
*Attorney, Agent, or Firm*—Susan A. McLean

[57] ABSTRACT

A method for producing simple seismic wavelet shapes with minimal side lobe energy for use as reference signals for seismic vibrators is disclosed.

3 Claims, 5 Drawing Sheets

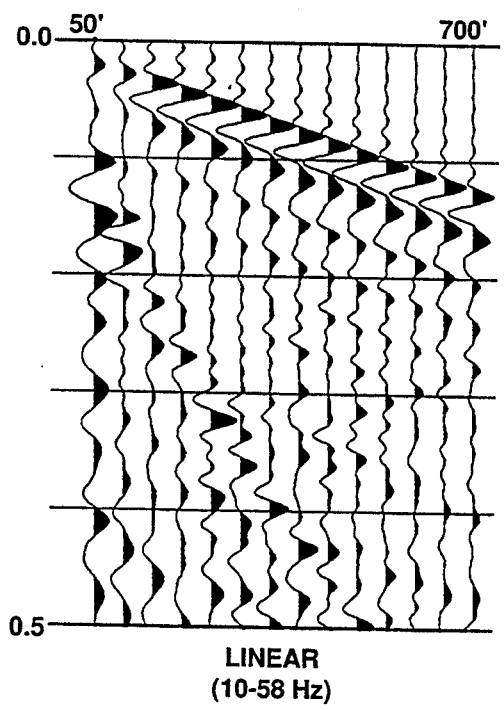
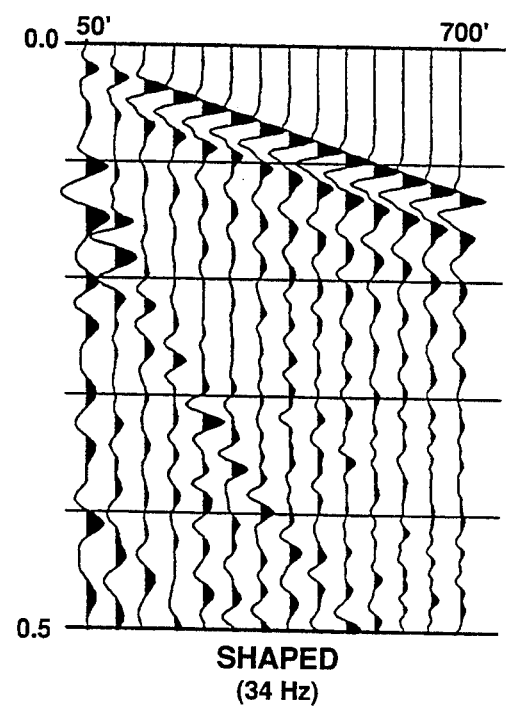
FIG. 5A  
LINEAR  
(10-58 Hz)
FIG. 5B  
SHAPED  
(34 Hz)

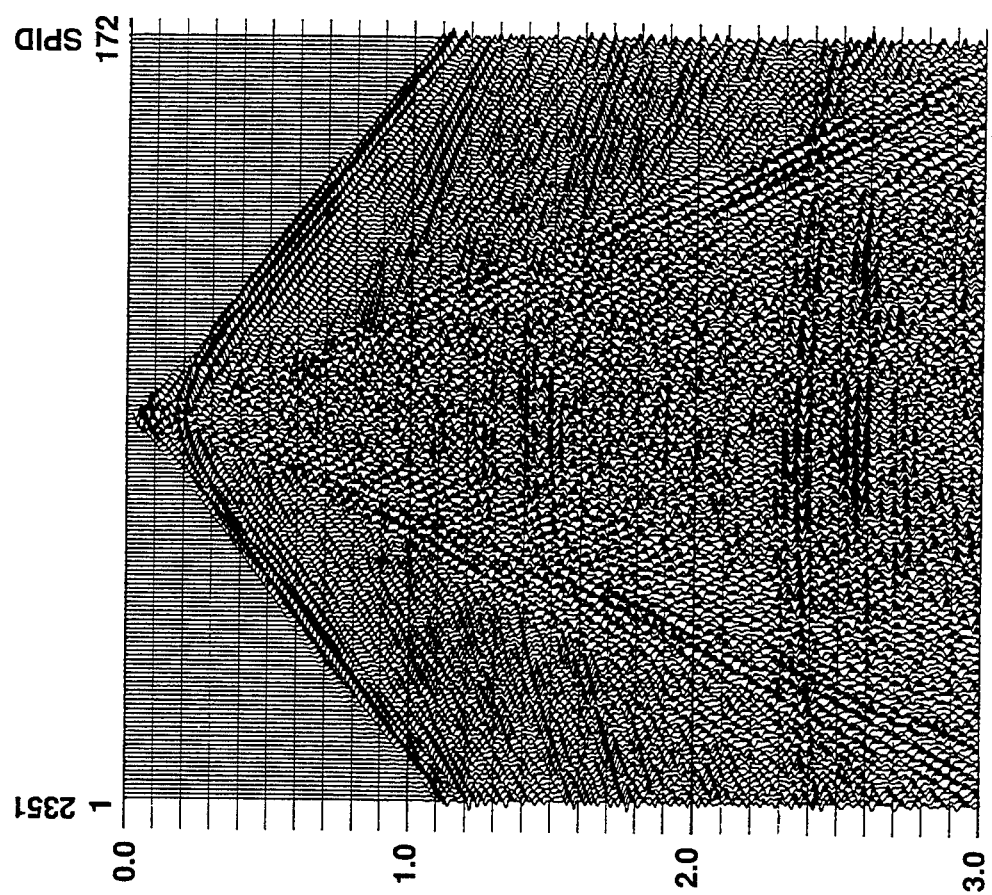
FIG. 6B SHAPED
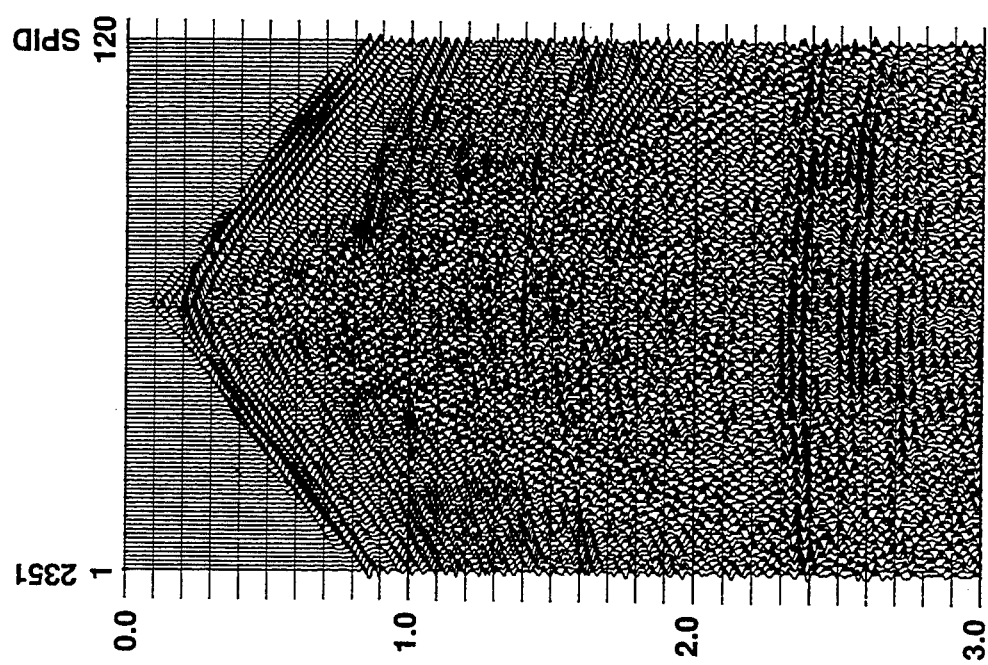
FIG. 6A LINEAR

SHAPED-SWEEP TECHNOLOGY

BACKGROUND

1. Field of the Invention

This invention relates to methods for acquisition of seismic data, and, more particularly, to seismic vibrator techniques and specifically deals with the reference signal used to drive a seismic vibrator.

2. Description of the Related Art

In the acquisition of seismic data, seismic waves are used to determine the nature, orientation and location of subsurface formations. In reflection seismic technology, seismic waves are generated at the earth's surface. These waves travel through the earth's crust and the compressional mode of these waves are reflected back to the surface by the various subsurface formations. These reflected waves are detected by means of seismic receivers, or geophones.

This invention focuses on the method of producing the seismic waves. There are various means for production of seismic waves commonly used in the art, which means include but are not limited to explosives and vibrators. Vibrators are used, as their name implies, to vibrate the earth's crust. Their use is attractive as compared to explosives because of their relative safety and the cost. Vibrators, when energized, impart relatively low energy into the earth's crust. Typically, the vibrator operator selects an energization interval, and data are recorded both during the energization interval and a subsequent period during which the vibrator is not energized, but the reflected signals are still being received. This technology, originally developed by Conoco, is referred to in the art as "vibroseis."

With the development of the vibrator in seismic technology came increasing attention to the nature of the signal driving the vibrator. This signal is a controlled wave train, a wave train being a wave which has several cycles. This signal is a sinusoidal vibration of continuously varying frequency. The term for this input wave is "sweep", and a sweep period is commonly several seconds or longer.

Various types of sweeps are possible, each employing some sort of amplitude taper, which is a window function (such as a standard Hanning window) that is applied to the beginning and end of the sweep to insure the amplitude of the sweep smoothly goes to zero at its endpoints. The standard signal is a linear sweep. A linear sweep is a sinusoidal-type signal of essentially constant amplitude envelope wherein the frequency varies linearly with time, either increasing or decreasing monotonically within a given frequency range, yielding a constant sweep rate. A non-linear sweep is a sinusoidal-type signal wherein the frequency varies nonlinearly with time. Typical nonlinear sweeps attempt to compensate for the increased loss or attenuation of higher frequency waves as they travel through the earth by spending more vibration time at the higher frequencies.

In vibration-generated seismics, the field record is correlated with the sweep wave train to produce a correlogram or correlated record. The correlated record resembles a conventional seismic record, as one would receive with an explosive or impulsive seismic source.

It is well known in the seismic art that an undesirable byproduct in vibration-generated seismic signals is side lobe energy. Side lobes are byproducts of the correlation process and lengthen and complicate the desired wavelet. Visually, this appears as small oscillations to either side of the central three lobes of a seismic wavelet. Current methods for acquiring vibrator data, particularly linear sweeps, produce complicated seismic wavelets with excessive amounts of side lobe energy after correlation. This side lobe energy degrades data quality and adversely affects the ability to estimate and control the seismic wavelet in processing. There is therefore a need to generate vibrator data that have a simple wavelet shape and minimal side lobe energy, thus reducing seismic signal distortion and enhancing seismic resolution.

Most vibrator data are acquired using linear sweeps as the reference signal. These data are then correlated with the linear sweep reference signal to produce a record. As stated above, linear sweeps, when correlated or deconvolved, produce complicated wavelets with significant amounts of side lobe energy. Some vibrator data are also acquired using a class of nonlinear sweeps designed to compensate for the increased loss of high frequency waves as they propagate through the earth. These sweeps produce even more complicated wavelets with higher side lobe content than linear sweeps. The large amount of side lobe energy these types of conventional sweeps produce after correlation degrades data quality and adversely affects the ability to estimate and control the seismic wavelet in processing.

Rietsch, E. "Vibroseis Signals with Prescribed Power Spectrum," Geophysical Prospecting, Vol. 25, pp. 613–620 (1977), developed a relationship between a sweep's instantaneous phase function and its power spectral density for sweeps having a constant amplitude envelope, using the fact that a sweep's power spectrum is inversely related to the rate of frequency change of the sweep. Rietsch proposed a method for the determination of an appropriate phase function for a sweep which is to have a certain predetermined power spectrum, noting that the method could be used to design sweeps with autocorrelation functions which had low side lobes. Rietsch at page 617. Therefore, sweeps having predefined power spectra could be designed using this relationship, but vibrator electronic control systems of that time could not reproduce (let alone accurately follow) a user-defined sweep, making this point academic. With the recent advent of a new generation of vibrator control instruments based on advanced microprocessor technology, tight control of the vibrator output force (both amplitude and phase) is now possible. This advancement enables user-defined sweeps to be accurately reproduced and followed by the vibrator. This technological advancement has inspired research into optimal shapes of sweeps, leading to the sweep of this invention.

It is an object of this invention to provide a sweep which, when used in a vibratory seismic system, will produce a signal with minimal side lobe correlation noise.

It is a further object of this invention to provide a sweep which, when used in a vibratory seismic system, will produce a signal which has a simple wavelet shape.

It is a further object of this invention to improve substantially vibratory seismic technology with little or no increase in cost.

These objects, features and advantages of this invention, as well as others, will be more clearly discerned by one of reasonable skill in the relevant art from the specification, figures and claims herein.

SUMMARY OF THE INVENTION

The invention consists of a method for producing simple seismic wavelet shapes with minimal side lobe energy. This method comprises, first, selecting a power spectrum from the group consisting of spectra which are derivatives of Gaussian functions, or their substantial equivalents; then computing a spectrally shaped sweep from this power spectrum so that the Fourier transform of the sweep's autocorrelation is substantially the same as that of the desired spectrum; then using the spectrally shaped sweep as a reference signal for driving a seismic vibrator; using the vibrator to impart vibrations to the earth; collecting seismic data from the earth, which data result from the vibrator; and deconvolving the seismic data with the reference signal.

BRIEF DESCRIPTION OF THE DRAWINGS

FIG. 5A shows downhole seismic data after correlation using a linear sweep.

FIG. 5B shows downhole seismic data after correlation using a shaped sweep for the same location as in FIG. 5A.

FIG. 6A shows a correlated shot record for a linear sweep.

FIG. 6B shows a correlated shot record for a shaped sweep for the same vibrator point as in FIG. 6A.

DESCRIPTION OF THE PREFERRED EMBODIMENT

The goal of shaped-sweep technology is to provide a technique which spectrally shapes a vibrator sweep to generate a simple wavelet shape with minimal side lobe energy after correlation. Spectrally shaped sweeps provide significant improvement in vibrator source performance over conventional sweeps. Side lobe energy is suppressed by 24–30 decibels in the output force signature over its linear-sweep counterpart producing improved data quality and clean (similar to those generated by impulsive sources) first arrivals.

Spectrally shaped sweeps are specifically designed to generate a simple correlation pulse with minimal side lobe energy. A shaped sweep, unlike its linear-sweep counterpart, is designed to yield a specific power spectrum. For a desired spectrum, an appropriate sweep is generated so that the Fourier transform of its autocorrelation matches the desired spectrum. Therefore, sweeps having extremely low correlation side lobes can be designed by specifying the appropriate power spectrum. Since the power spectrum (rather than the amplitude spectrum) of a sweep is shaped, there is no theoretical advantage in recording uncorrelated versus correlated data. The same is not true for linear-sweep data where a slightly better pulse shape can be obtained in processing with uncorrelated data.

Figure 1:
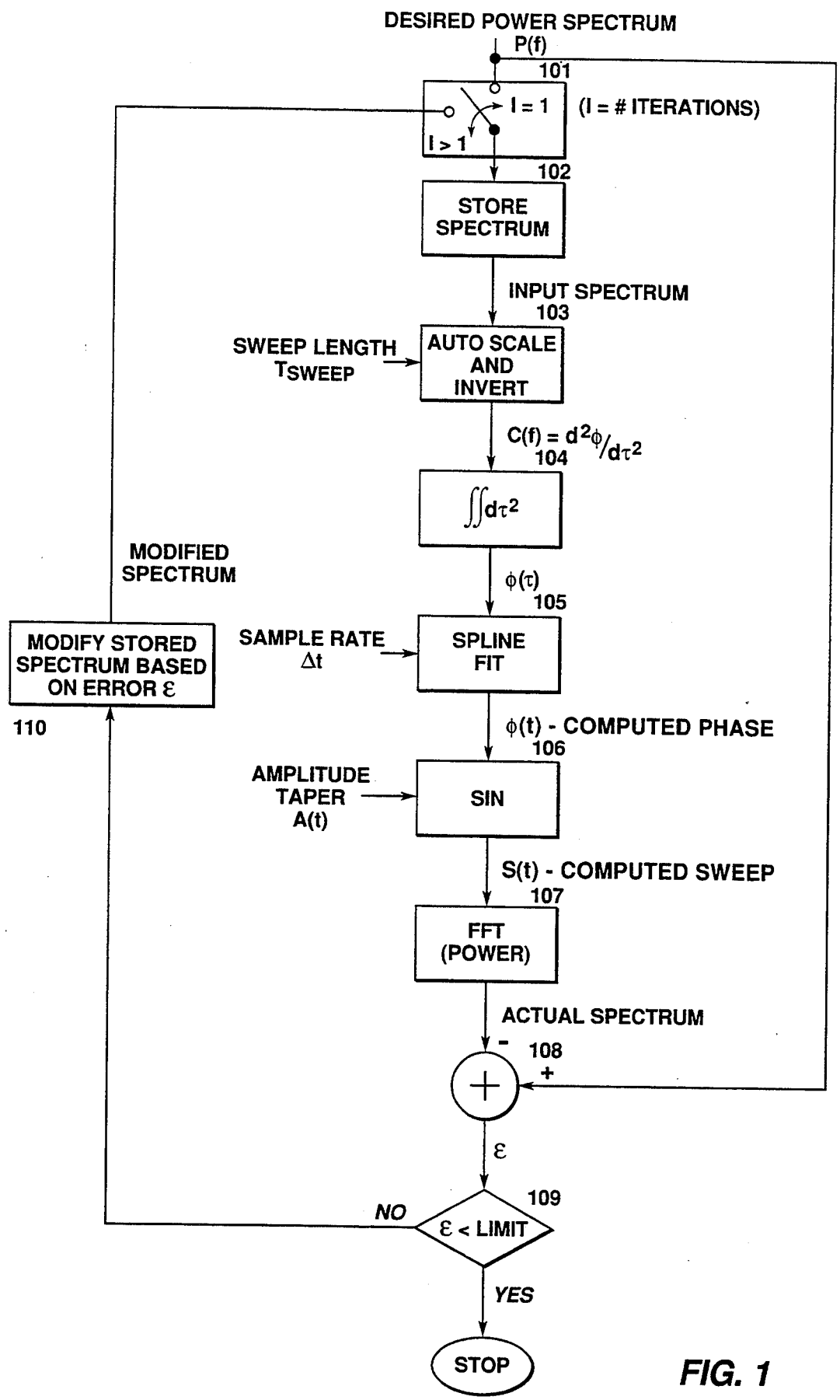
FIG. 1 depicts a flow diagram for an algorithm that computes a sweep from a power spectrum selected using the method of this invention.

An algorithm to calculate a class of sweeps from a power spectrum using the instantaneous phase relationship developed by Rietsch is depicted in FIG. 1. While this algorithm uses a relationship developed by Rietsch, Rietsch did not propose an optimal power spectrum, such as that set forth in this invention, nor did he disclose a method for compensating for the effect of amplitude taper (non-constant amplitude envelope) which must be accounted for to achieve acceptable results.

The spectrum proposed by this invention has the form:

$$P(f) = K\left[ \frac{f}{f_p} e^{-\frac{1}{m}(\frac{f}{f_p})^m} \right]^n, \quad (1)$$

which is recognizable to one skilled in the art as derivatives of the inverse transform of the general function $e^{-f^m}$, where $P(f)$ is the desired power spectrum ranging from 0 to $Ke^{-n/m}$ with K an arbitrary scaling constant;

f is frequency of the sweep in Hertz, typically ranging from 1 Hz to $3f_p$ Hz;

$f_p$ is frequency at which the spectrum peaks, and is user defined and set typically between 10 Hz and 80 Hz, and preferably between 20 Hz and 50 Hz, based on the expected dominant frequency to be recovered at the target after deconvolution;

m is a constant which defines the function type: for m=2 the functions are Gaussian, while for m≈2 the functions are substantially gaussian; m is not necessarily an integer;

n is the order of the derivative; e.g., for m=2 then n=1 is first derivative Gaussian, n=2 is second derivative Gaussian, n=i is $i^{th}$ derivative Gaussian; however, it is not necessary for n to be an integer.

A power spectrum is first selected from the family of spectra defined in equation (1) with powers m and n set to produce a substantially three-lobe wavelet. The peak frequency $f_p$ of the spectrum is next selected according to the dominant frequency expected to be recovered at the geologic target after deconvolution, and the selected spectrum is evaluated over the interval from $f_{min}$ to $f_{max}$, where typically $f_{min}=1$ and $f_{max}=3f_p$ Hertz. This spectrum then becomes the input to the algorithm of FIG. 1, which computes a shaped sweep of a specific length $T_{sweep}$, sample rate $\Delta t$, and amplitude taper $A(t)$ that has this desired power spectrum.

Typical shaped sweep lengths ($T_{sweep}$) range from 4 to 16 seconds with 6 to 8 second sweep lengths generally preferred. The sample rate $\Delta t$ must first satisfy the Nyquist criterion ($\Delta t < 1/(2f_{max})$) and then, where applicable, must be set according to the particular specifications of the vibrator electronics (e.g., Pelton Advance II instruments require $\Delta t = 1/2048$). The amplitude taper $A(t)$ is any typical window function familiar to those versed in the art such as a Hanning window described below:

$$A(t) = A \sin^2\left(\frac{\pi t}{2T_{taper}}\right) : t < T_{taper}$$

$$A(t) = A : T_{taper} \leq t \leq T_{sweep} - T_{taper}$$

$$A(t) = A \sin^2\left(\frac{\pi(T_{sweep} - t)}{2T_{taper}}\right) : t > T_{sweep} - T_{taper} \quad (2)$$

where:
A(t) is the window function ranging from 0 to A, with A an arbitrary scaling constant;
t is time ranging from 0 to $T_{sweep}$; and
$T_{taper}$ is the length of the window function applied at each end of the sweep: $T_{taper} \leq T_{sweep}/2$, with typical taper lengths ranging from $\frac{1}{8}$ to 1 second.

The algorithm of FIG. 1 uses the instantaneous phase relationship developed by Rietsch for sweeps having a constant amplitude envelope (A(t)=A for the entire sweep length) as its initial starting point. Successive iterations, depicted here in the form of a feedback loop, automatically compensate for the effect of amplitude taper (A(t)=window function). The resulting instantaneous phase function $\phi(t)$ is then converted to the desired sweep with the equation:

$$S(t) = A(t)\sin(2\pi\phi(t) + \Phi) \quad (3)$$

where:
S(t) is the desired shaped sweep computed in the algorithm;
A(t) is the selected window function, such as that described in Equation (2);
$\phi(t)$ is the instantaneous phase function computed in the algorithm in cycles; and
$\Phi$ is a constant representing the initial phase of the sweep in radians ranging from 0 to $2\pi$.

The algorithm works as follows. For the first iteration there is no feedback, hence the input spectrum is simply the desired spectrum P(f). This input spectrum is then scaled and inverted to obtain an estimate of the rate of frequency change of the sweep, $d^2\Phi(\tau)/d\tau^2$. From Rietsch:

$$\frac{d^2\phi(\tau)}{d\tau^2} = \frac{A^2(\tau)}{4P(f)} = C(f) \quad (4)$$

where:
$\tau$ denotes the stationary point of $\phi(t)$-ft, that is, $\tau$ is a solution of $d\phi(\tau)/d\tau$-f=0 and hence a function of f, and C(f) denotes the sweep rate.

Therefore, for constant amplitude envelope, the rate of change of frequency is inversely proportional to the desired power spectrum. Integrating this function twice with respect to $\tau$ gives the instantaneous phase function $\phi(\tau)$. Rietsch developed a numerical solution to this differential equation in terms of a set of recursive relationships, thereby allowing successive computation of the phase function $\phi(\tau)$ at the discrete times $\tau_n$:

$$\tau_{n+1} = \tau_n + \Delta\tau_n: \Delta\tau_n = \frac{2\Delta f}{C_n + C_{n+1}} \quad (5)$$

$$\phi_{n+1} = \phi_n + \frac{1}{2}\Delta\tau_n(f_{n+1} + f_n) + \frac{1}{12}(\Delta\tau_n)^2(C_n - C_{n+1}) \quad (6)$$

where:
$\Phi_n = \phi(\tau_n)$, $\tau_n = \tau(f_n)$, $C_n = C(f_n)$ denote the functions $\phi$, $\tau$, and C respectively, at the discrete frequencies $f_n$:

$$f_n = n\Delta f + f_{min}: \Delta f = \frac{f_{max} - f_{min}}{N} \quad (7)$$

and
N is the number of subintervals of equal width the frequency range [$f_{min}$, $f_{max}$] is divided into, typically 500–1000, with n representing the $n^{th}$ sample of N.

Since the discrete times $\tau_n$ are not, in general, uniformly spaced, the desired phase function $\phi(t)$, for uniformly spaced discrete times $t_n$ at the desired sample interval $\Delta t$, is computed by interpolation using a spline technique well known to those skilled in the art. The sweep S(t) is then computed from equation (3). By incorporating the desired sweep length as an additional input into the inversion, the desired power spectrum can now have completely arbitrary scaling. Equation (5) indicates the $\Delta\tau$'s, hence the sweep length, are a function of how the power spectrum is scaled. However, by first computing the length of the sweep (sum of the $\Delta\tau$'s) with arbitrary scaling, the desired sweep length can be obtained by rescaling the input spectrum by the ratio of the desired sweep length to the computed length. This scaling is performed for each iteration and insures the desired sweep length is maintained.

The first iteration represents the initial trial for a sweep having the desired power spectrum. However, since a constant amplitude envelope was assumed but not applied, the sweep will have a power spectrum that closely matches the desired spectrum only for those frequencies not affected by the amplitude taper. For those frequencies affected by the amplitude taper, the actual spectrum will fall considerably short of the desired spectrum. Therefore, the effect of amplitude taper (non-constant amplitude envelope) is accounted for by successively modifying the input spectrum. The power spectrum of the sweep is compared to the desired power spectrum for each successive iteration. The error $\epsilon$ is used to adjust the input spectrum in a manner well known to those versed in control systems theory as to minimize the difference between the desired and actual spectra. This difference or error can be made sufficiently small; typically $\epsilon < 1\%$. The algorithm continues to iterate through this same process until the power spectrum of the sweep is substantially identical to the desired power spectrum, at which point, the algorithm stops, and the phase function $\phi(t)$, hence the sweep S(t), has been determined for the power spectrum selected from equation (1).

The process by which the sweep signal is produced is more easily understood by reference to FIG. 1. The process starts with step 101. In the first iteration (I=1), the desired power spectrum is accepted. This spectrum is then stored in step 102 and is the input spectrum for subsequent steps in the process.

The subprocess of Autoscale and Invert in step 103 can best be understood as a two-step process. First, since the amplitude envelope $A(\tau)$ is assumed to be constant ($A(\tau)=A$), Equation 4 herein becomes $$\frac{A^2}{4P(f)} = C(f), \tag{8}$$

which reduces to $$C(f) = \frac{1}{P(f)}, \tag{9}$$

since $A^2/4$ is simply an additional constant which can be accounted for by the already arbitrary scaling of the power spectrum, K. Using the "input" spectrum and performing the necessary division (inversion) in Equation 9 herein gives the function C(f), which is the sweep rate. Equation 5 herein is then used to determine a set of times $\Delta\tau_n$ and $\tau_n$ for the range of frequencies [$f_{min}$, $f_{max}$] determined by the desired spectrum and the frequency sampling interval $\Delta f$. This calculation will not, in general, give a computed sweep length $\tau_N$(sum of the $\Delta\tau_n$'s) that is equal to the desired sweep length $T_{sweep}$. Therefore, the "input" spectrum is rescaled by a normalization factor equal to $T_{sweep}/\tau_N$ and the function C(f) is then recomputed. Application of Equation 5 will now result in a set of times $\Delta\tau_n$ and $\tau_n$ which will give a total computed sweep length equal to the desired sweep length.

A double integration of the sweep rate is then carried out in step 104 to give the phase $\phi(\tau)$ as a function of $\tau$. Equations 6 and 7 herein, together with the $\Delta\tau_n$ calculated in the previous step, are used for this purpose. The output of subprocess 104 is the phase of this sweep signal as a function of time with a non-uniform sampling in time since the $\Delta\tau_n$ are generally not equal. In order to make use of this phase in the vibrator, it is, however, necessary to have the phase at uniform intervals of time.

The subprocess identified as a Spline Fit in step 105 performs the operation of spline fitting that is known to those skilled in the art and, upon resampling, produces a phase $\phi(t)$ at the desired uniform increments of time $\Delta t$. This is referred to as the computed phase.

In the next subprocess, step 106, an amplitude taper A(t), such as that given in equation 2, is applied to the sine of the computed phase to give a computed sweep signal S(t), using equation 3. A Fourier Transform (FFT), as shown in step 107, is applied to the computed sweep signal to obtain its power spectrum. The actual power spectrum is then compared to the desired power spectrum in step 108. Specifically, the actual power spectrum is subtracted from the desired spectrum. The difference is denoted by the error $\epsilon$ and is a measure of how closely the actual spectrum is in agreement with the desired spectrum.

This error spectrum is checked to determine whether it is sufficiently small by comparing it with some threshold in step 109. If the error spectrum is sufficiently small, then the process is terminated and the computed sweep signal is then used as the reference signal for the vibrator. If, on the other hand, the error is too large, then it is an indication that the sweep signal must be modified. A typical threshold for deciding if the error signal is too large might be when the error is more than about one per cent of the peak magnitude of the desired spectrum. The error spectrum, if it is too large, is then used to modify the stored spectrum from step 102, using a method well known to those skilled in the art of control systems, to define a modified spectrum. Specifically, some fraction, but less than 100%, of the error spectrum is added to the stored spectrum to modify it in step 110. The choice of this fraction is discussed later.

The process then returns to step 101 for another iteration. The iteration number I is now greater than one and, instead of using the desired power spectrum, the modified power spectrum from step 110 is used. This path is denoted by the position of the switch when I>1. The entire sequence of steps from 102 to 109 is repeated, and the error spectrum is once again checked against the threshold. This iterative process continues until the process converges to a solution, which happens when the actual power spectrum and the desired power spectrum are sufficiently similar.

The process of choosing the fraction of the error spectrum that is added to the stored spectrum to modify it is well known to those versed in control systems theory. If the fraction is zero, then the spectrum is not modified, hence convergence will never take place and the iteration process continues indefinitely. If the fraction is 100% or greater, there is a significant risk that the process will become unstable. This, again, is well known in control systems theory. A typical choice for this fraction is between 25% and 75%. This yields convergence in a reasonably short time without destabilizing the process.

The algorithm of this invention outputs the computed sweep, or any function that describes the sweep, to a data file in a data format compatible with any manufacturer's vibrator electronics which will accept directly or closely approximate a user-defined sweep, such as Pelton Inc. Advance II vibrator electronics, Sercel VE 416 vibrator electronics, or any other similarly equipped vibrator electronics package.

The technique described can be applied to any vibratory-type source and is not limited to those sources used in the geophysical industry.

A specific class of power spectra best suited for vibrator operations is:

$$P(f) = K\left[\frac{f}{f_p} e^{-\frac{1}{2}(\frac{f}{f_p})^2}\right]^2 \tag{10}$$

wherein, from the general equation (1), powers m=n=2. This equation is second derivative Gaussian and is specifically known to those versed in the art to describe a Ricker wavelet when K is equal to $2/(f_p\sqrt{\pi})$. Shaped sweeps designed from this particular spectrum type produce simple three-lobe wavelets with little or no side lobe energy after correlation and are therefore ideal for vibrator operations.

EXAMPLE

Figure 2A:
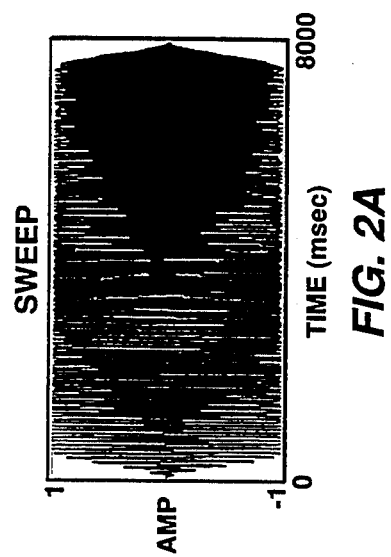
FIG. 2A shows a conventional linear sweep.
Figure 2B:
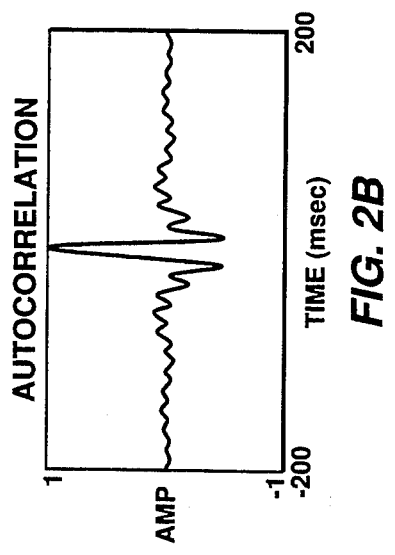
FIG. 2B shows the autocorrelation of the linear sweep of FIG. 2A.
Figure 2C:
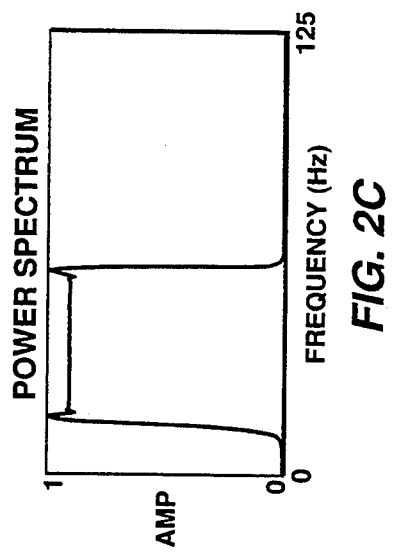
FIG. 2C shows the power spectrum of the linear sweep of FIG. 2A.
Figure 3A:
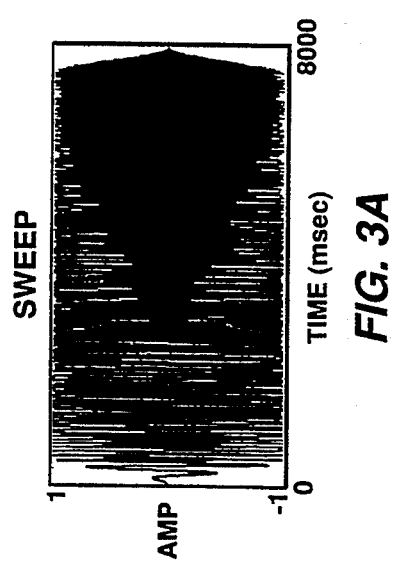
FIG. 3A is a shaped sweep using the method of this invention.
Figure 3B:
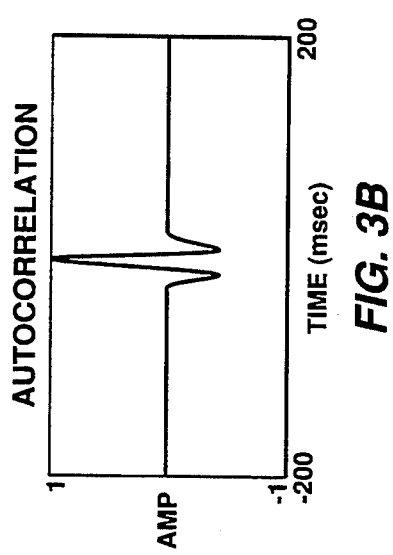
FIG. 3B shows the autocorrelation of the shaped sweep of FIG. 3A.
Figure 3C:
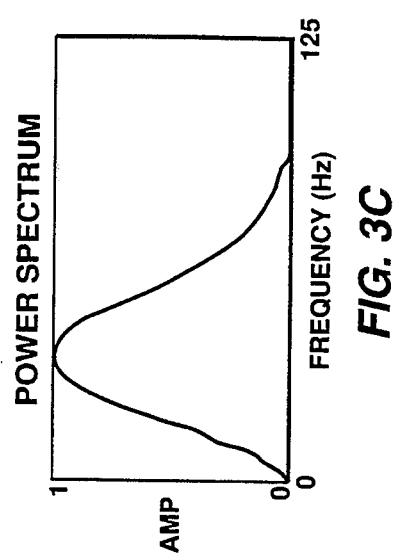
FIG. 3C shows the power spectrum of the shaped sweep of FIG. 3A.

FIG. 2A and FIG. 3A show a comparison between a standard linear sweep (10 to 58 Hz) and a shaped sweep ($f_p$=34 Hz) generated by this algorithm with the power spectrum defined in Equation 10, respectively. Both sweeps have the same center frequency (34 Hz). FIGS. 2A, 2B and 2C show the linear sweep with its associated autocorrelation and power spectrum. The large side lobe energy present in the wavelet is due to the steep slopes in the power spectrum. This is true of any linear sweep. In contrast, FIGS. 3A, 3B and 3C show the shaped sweep with its associated autocorrelation and power spectrum. Note the dramatic difference in autocorrelation side lobes between the two sweeps. Side lobe energy is suppressed by 40 dB over the standard linear sweep. As seen in FIG. 3C, the smooth shape of the power spectrum is not produced by some amplitude function applied to the sweep (the amplitude of the sweep is flat besides the normal taper.) Instead, it is produced by varying the sweep rate ($\Delta f/\Delta t$) since the power spectral density is inversely proportional to the rate of change of frequency.

It is important to note that linear sweeps can not be processed or deconvolved to produce an output wavelet similar to that of shaped sweeps. Linear sweeps are missing critical frequencies at the low end resulting in a complex wavelet shape even after optimal shaping (amplitude) in processing. Shaped sweeps, however, contain the appropriate frequencies at the appropriate spectrum levels to generate simple three-lobe wavelets after correlation.

Figure 4A:
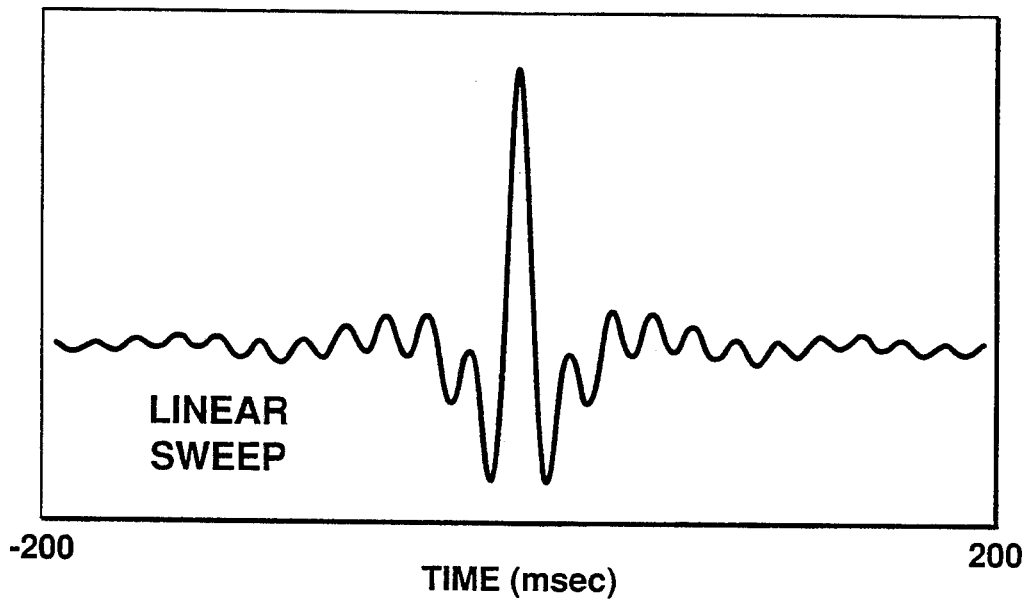
FIG. 4A shows the actual output force of a vibrator for a linear sweep after correlation.
Figure 4B:
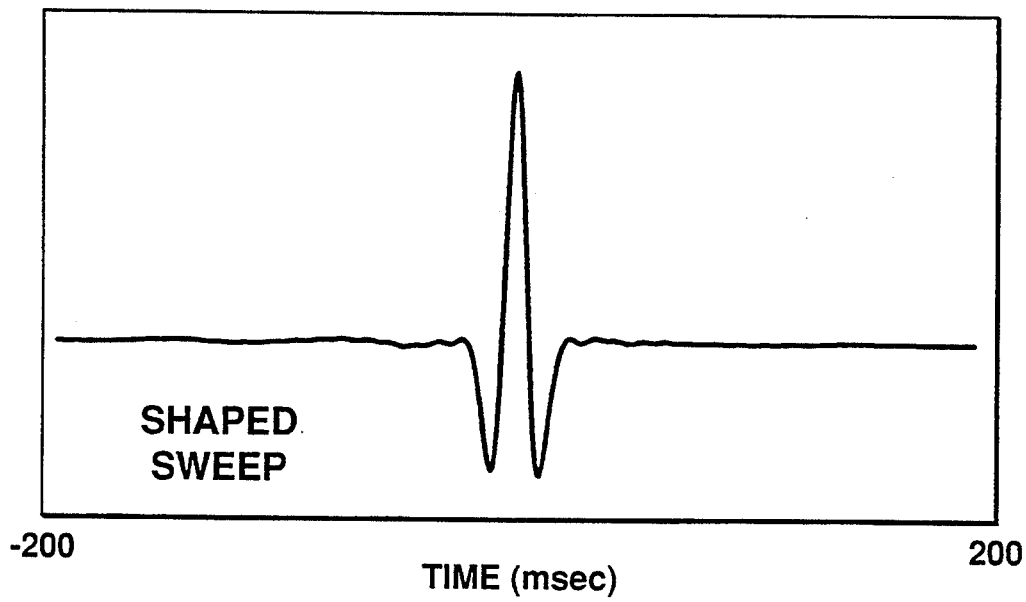
FIG. 4B shows the actual output force of a vibrator for a shaped sweep after correlation.

The results from an actual vibrator test comparing shaped and conventional linear sweeps are shown in FIGS. 4A and 4B and FIGS. 5A and 5B. The shaped sweep depicted in FIG. 3A was downloaded into a Litton LRS 315 vibrator equipped with Pelton Advance II vibrator electronics and compared with the standard linear sweep of FIG. 2A. FIGS. 4A and 4B show the output force of the vibrator after it was correlated with its respective reference sweep. The shaped sweep (FIG. 4B) produces a superior vibrator output-force wavelet, and side lobe energy is suppressed by 24–30 dB in the output force signature over its linear-sweep counterpart (FIG. 4A). FIGS. 5A and 5B show a downhole comparison between the shaped and linear sweeps described in FIGS. 4A and 4B. The downhole data generated with the shaped sweep (FIG. 5B) result in clean, almost impulsive-type first arrivals. In contrast, the large amount of side lobe energy preceding the linear-sweep first arrivals (FIG. 5A) is typical of conventional vibrator techniques.

FIGS. 6A and 6B show a shot-record comparison between the shaped and linear sweeps for the same vibrator point. The shaped-sweep record (FIG. 6B) exhibits extremely clean first arrivals and shows a clear improvement in data quality, particularly at 1.5 seconds. The slight increase in surface-wave noise observed on the shaped-sweep record is due to the fact that the data were recorded with the low-cut filters out, whereas the linear-sweep data were recorded with the low cuts in.

What is claimed is:

1. A method for producing seismic wavelet shapes with minimal side lobe energy, which method comprises:
   a. selecting a power spectrum from the group consisting of spectra which are derivatives of Gaussian functions and their substantial equivalents within the frequency range of about 0.5 $f_p$ Hz to about 2.0 $f_p$ Hz, where $f_p$ is the frequency at which the spectrum peaks, and is set between about 10 Hz and about 80 Hz;
   b. computing a spectrally shaped sweep for said power spectrum so that the Fourier transform of said sweep's autocorrelation is substantially the same as that of the spectrum;
   c. using said spectrally shaped sweep as a reference signal for driving a seismic vibrator;
   d. using said vibrator to impart vibrations to the earth;
   e. collecting seismic data from the earth, which data result from said vibrations; and
   f. deconvolving the seismic data with the reference signal.

2. A method for producing seismic wavelet shapes with minimal side lobe energy, which method comprises:
   a. selecting a power spectrum from the group consisting of the following equation and its substantial equivalents:

$$P(f) = K \left[ \frac{f}{f_p} e^{-\frac{1}{m}(\frac{f}{f_p})^m} \right]^n$$

wherein
   P(f) is the desired power spectrum,
   K is an arbitrary constant used to scale the equation,
   f is the frequency of the sweep in Hertz, ranging from about 0.5 $f_p$ Hz to about 2.0 $f_p$ Hz,
   $f_p$ is the frequency at which the spectrum peaks, and is set between about 10 Hz and about 80 Hz,
   m is a constant which defines the function type, where m is not necessarily an integer, and
   n is the order of the derivative, where n is not necessarily an integer;
   b. computing a spectrally shaped sweep for said power spectrum so that the Fourier transform of said sweep's autocorrelation is substantially the same as that of said power spectrum;
   c. using said spectrally shaped sweep as a reference signal for driving a seismic vibrator;
   d. using said vibrator to impart vibrations to the earth;
   e. collecting seismic data from the earth, which data result from said vibrations; and
   f. deconvolving the seismic data with said reference signal.

3. The method of claim 2, wherein m and n are each equal to 2.

* * * * *